United States Patent
Hatori

(10) Patent No.: US 7,254,298 B2
(45) Date of Patent: Aug. 7, 2007

(54) LIGHT SOURCE MODULE

(75) Inventor: Masami Hatori, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/393,690

(22) Filed: Mar. 31, 2006

(65) Prior Publication Data

US 2006/0222298 A1 Oct. 5, 2006

(30) Foreign Application Priority Data

Mar. 31, 2005 (JP) .............................. 2005-103791
Jan. 23, 2006 (JP) .............................. 2006-013815

(51) Int. Cl.
*G02B 6/42* (2006.01)
(52) U.S. Cl. .............................. 385/43; 385/15; 385/39
(58) Field of Classification Search ................... 385/43
See application file for complete search history.

(56) References Cited

U.S. PATENT DOCUMENTS 3,779,628 A * 12/1973 Kapron et al. ................. 385/43
5,502,787 A * 3/1996 Capasso et al. ............. 385/123

FOREIGN PATENT DOCUMENTS

| JP | 2004-179595 (A) | 6/2004 |
| JP | 2004-252425 (A) | 9/2004 |
| JP | 2004-253783 (A) | 9/2004 |

* cited by examiner

*Primary Examiner*—Jennifer Doan
(74) *Attorney, Agent, or Firm*—Sughrue Mion, PLLC

(57) ABSTRACT

A light source module includes at least one light source, first optical waveguide which causes light entering therein from a light inlet end face to emanate from a light outlet end face, and an inlet optical system which collects light emitted from the light source and couples it to the light inlet end face of the first optical waveguide. The light inlet end face of the first optical waveguide is larger than the light outlet end face thereof in cross-sectional area of the core.

8 Claims, 8 Drawing Sheets

LIGHT SOURCE MODULE

BACKGROUND OF THE INVENTION

1. Field of the Invention

This invention relates to a light source module comprising a light source, an optical waveguide and an inlet optical system for coupling light emitted from the light source to one end of the optical waveguide.

2. Description of the Related Art

There has been well known a light source module comprising a semiconductor laser and an inlet optical system for coupling light emitted from the semiconductor laser to a light inlet end face of an optical fiber as an optical communication component. In the inside of the light source module, the inlet optical system and the optical fiber are fixed together with an adhesive means such as solder or adhesive in order to stably keep the semiconductor laser coupled to the light inlet end face of the optical fiber in the order of micro meters.

In such an optical module, the package accommodating therein the light source module is generally hermetically sealed in order to prevent deterioration of the laser by humidity of the atmosphere. For example, the structure represented by the CAN package is representative of a sealing structure for protecting a semiconductor laser or an end face of a laser. In such a light source module, there has been a problem that pollutant remaining in the hermetically sealed package can adhere to an optical component such as a light outlet end face of the laser, the inlet optical system or the optical fiber to deteriorate the laser properties. Especially, the pollutant adheres more where is high in optical density. (dust collection effect) Such dust collection effect is more remarkable in light source modules comprising, for instance, a GaN semiconductor laser which radiates a laser beam in the range of 350 to 500 nm (400 nm band) since in such light source modules, photon energy is high and a photochemical reaction with material is apt to occur.

As a pollutant, for instance, hydrocarbon compound mixed therein from the atmosphere of a producing step can be included, and there has been known a fact that material polymerized or decomposed by the laser beam adheres to the hydrocarbon compound to prevent improvement in optical output.

In Japanese Unexamined Patent Publication No. 2004-179595, there has been disclosed a technology where, in order to suppress pollution of the light inlet end face of the optical fiber, the light inlet end face of the optical fiber is coated with a photo-catalyst such as titanium oxide film active to laser beams and/or nitrogen-doped titanium oxide film. Further, in Japanese Unexamined Patent Publication No. 2004-253783, there has been disclosed a technology where a transparent body such as a glass block is brought into close contact with the light inlet end face of the optical fiber to protect the light inlet end face of the optical fiber. Further, in Japanese Unexamined Patent Publication No. 2004-252425, there has been disclosed a technology where the light inlet end face of the optical fiber is brought into close contact with the outside of the window of the package to suppress adhesion of the pollutant to the light inlet end face of the optical fiber.

As described above, the package of a precision optical component such as a semiconductor laser or an optical fiber is hermetically sealed in order to protect the precision optical component from pollutant. However, since the package for hermetically sealing each of optical systems which are variously shaped are not for a wide use and accordingly must be ordered for each optical system, whereby cost of thousands to tens of thousands of yens is required which adds to the cost of light source modules.

SUMMARY OF THE INVENTION

In view of the foregoing observations and description, the primary object of the present invention is to provide a light source module which can suppress adhesion of pollutant and at the same time, has a high reliability.

In accordance with the present invention, there is provided a light source module comprises at least one light source, a first optical waveguide which causes light entering therein from a light inlet end face to emanate from a light outlet end face, and an inlet optical system which collects light emitted from the light source and couples it to the light inlet end face of the first optical waveguide, wherein the improvement comprises that the light inlet end face of the first optical waveguide is larger than the light outlet end face thereof in cross-sectional area of the core.

The first optical waveguide may comprise an optical fiber. It is preferred that "the light inlet end face of the first optical waveguide is larger than the light outlet end face thereof in cross-sectional area of the core" be realized, for instance, by a tapered optical waveguide.

Further, a second optical waveguide which is constant in the direction of waveguide in cross-sectional area of the core may be fused to or in contact with the light outlet end face of the first optical waveguide. The second optical waveguide may be an optical fiber. It is preferred that the core diameter of the end face of the second optical waveguide facing the light outlet end face of the first optical waveguide be larger than that of the light outlet end face of the first optical waveguide.

The light source may emit a laser beam emitted from at least one semiconductor laser with an oscillation wavelength of 350 nm to 450 nm. It is preferred that the laser beam entering the light inlet end face of the first optical waveguide be not higher than 0.08 $[mW/\mu m^2]$.

Further, the light source may comprise one of a single single-mode cavity semiconductor laser, single-mode cavity semiconductor lasers arranged in an array, a single multiple cavity semiconductor laser, multiple cavity semiconductor lasers arranged in an array, and combinations of a single cavity semiconductor laser and a multiple cavity semiconductor laser.

The "single cavity semiconductor laser" is a semiconductor laser which is single in transverse mode and the "multiple cavity semiconductor laser" is a semiconductor laser which is multiple in transverse mode. The term "arranged in an array" means, for instance, those in which semiconductor laser chips are arranged in an array or those having two or more light emitting points on one board.

When the diameter of light impinging upon the light inlet end face of the first optical waveguide is represented by Dbeam, the numerical aperture of the light at the light inlet end face of the first optical waveguide is represented by NAbeam, the diameter or the length of the longer side of the core of the light inlet end face of the first optical waveguide is represented by Din, the numerical aperture of the core at the light inlet end face of the first optical waveguide is represented by NAin, the diameter or the length of the longer side of the core of the light outlet end face of the first optical waveguide is represented by Dout and the numerical aperture of the core at the light outlet end face of the first optical waveguide is represented by NAout, Din×NAin may be equal to Dout×NAout wherein Dbeam<Din and NAbeam<NAin.

When the core of the light inlet end face or light outlet end face of the first optical waveguide are cylindrical, Din and Dout respectively represent the diameter of the core, and when the core of the light inlet end face or light outlet end face of the first optical waveguide are rectangular, Din and Dout respectively represent the longer side of the core.

DESCRIPTION OF THE PREFERRED EMBODIMENTS

Light source modules in accordance with embodiments of the present invention will be described with reference to the drawings, hereinbelow.

1. Production of a Tapered Fiber

Production of a tapered fiber (the first optical waveguide) will be described first.

1-1 A Method of Production by Heating with a Gas Burner

Figure 1A:
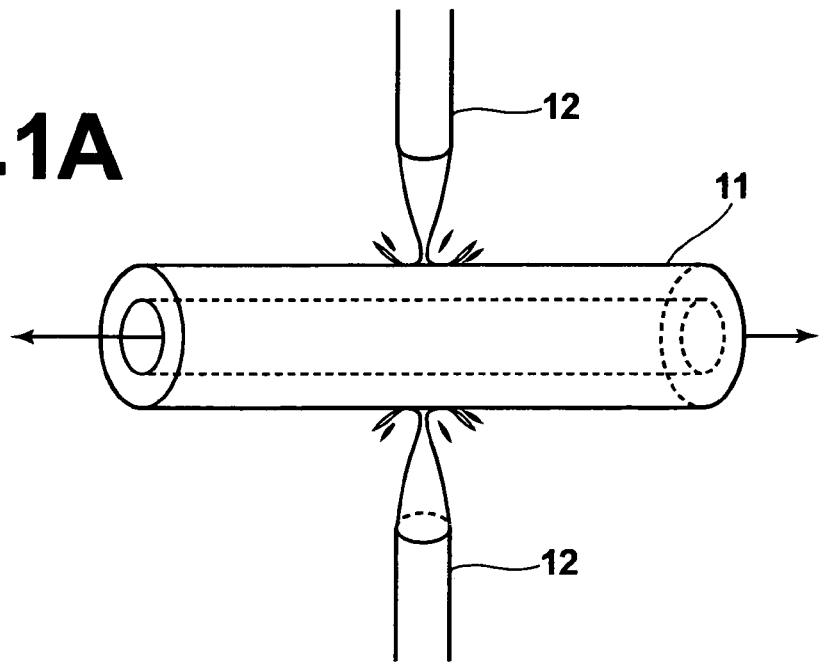
FIGS. 1A to 1D are views for illustrating a method of producing a tapered fiber by heating with a gas burner.
Figure 1B:
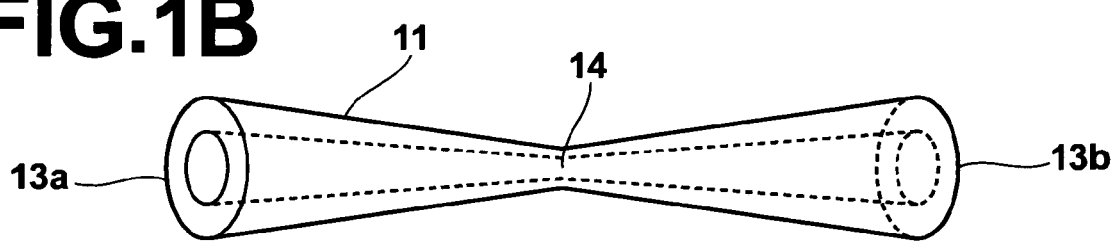
Figure 1C:
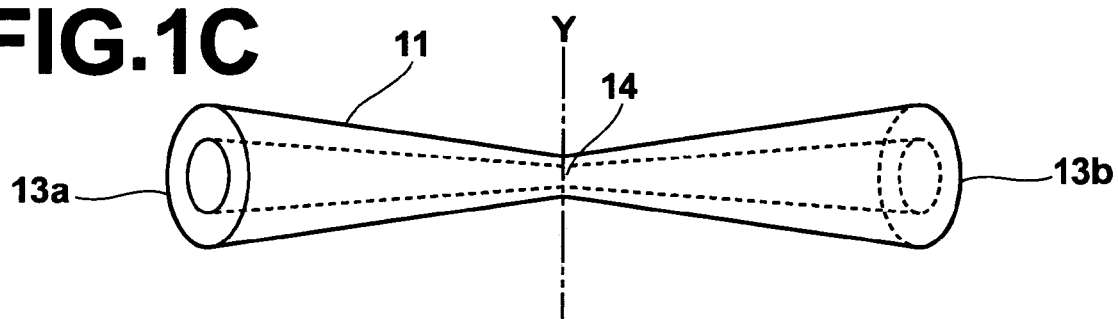
Figure 1D:
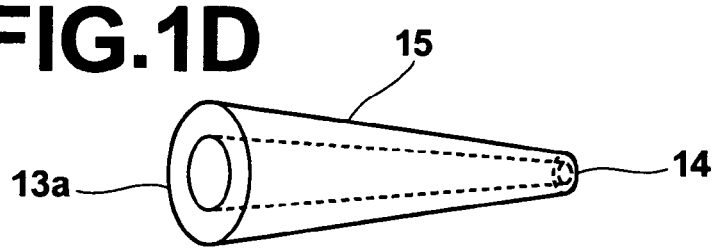

A predetermined part of a quartz fiber 11 which is 200 μm in the core diameter and 400 μm in the clad diameter is heated to about the melting point of quartz, for instance, with a gas burner 12 (FIG. 1A). Then immediately after the heated part is softened, the quartz fiber 11 is stretched with uniform force in the direction of one end portion and the other end portion thereof (the direction of arrow X (FIG. 1B). By this, the light inlet end face 13a and the light outlet end face 13b of the quartz fiber 11 becomes 200 μm in the core diameter and 400 μm in the clad diameter, and the heated part 14 becomes, for instance, 50 μm in the core diameter and 100 μm in the clad diameter. And then by cutting the quartz fiber 11 in a position of a desired core diameter and a desired clad diameter (for instance, a position Y in FIG. 1C), a tapered fiber 15 where the core diameter of one end face 13a is larger than that of the other end face 14 is obtained (FIG. 1D). The values of the core diameter and the clad diameter need not be limited to those described above.

1-2 A Method of Production by Heat Treatment

Figure 2:
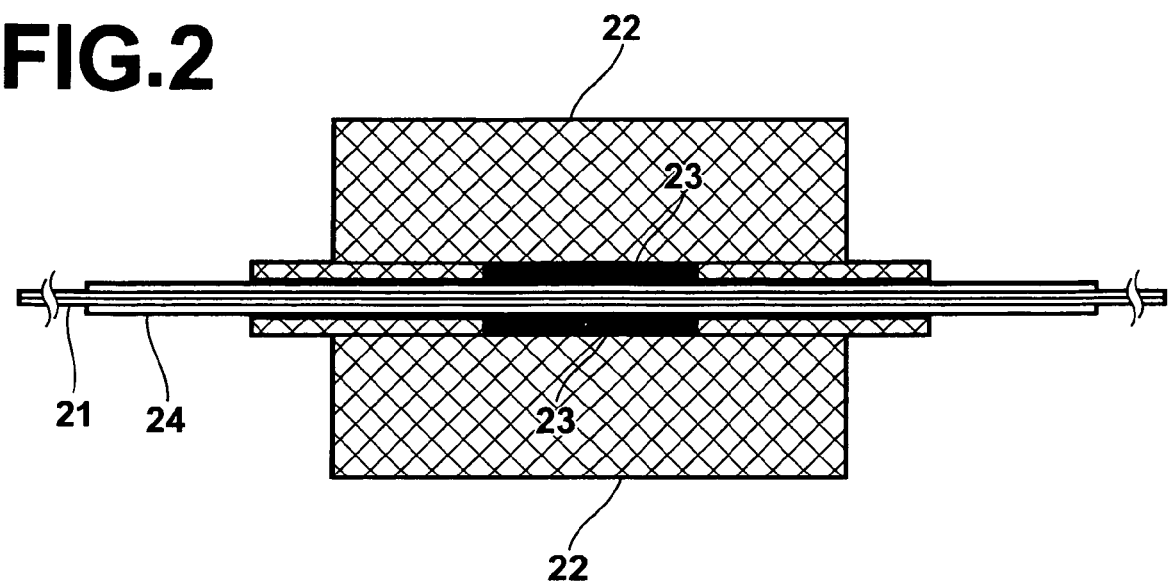
FIG. 2 is a view for illustrating a method of producing a tapered fiber by heat treatment.
Figure 3:
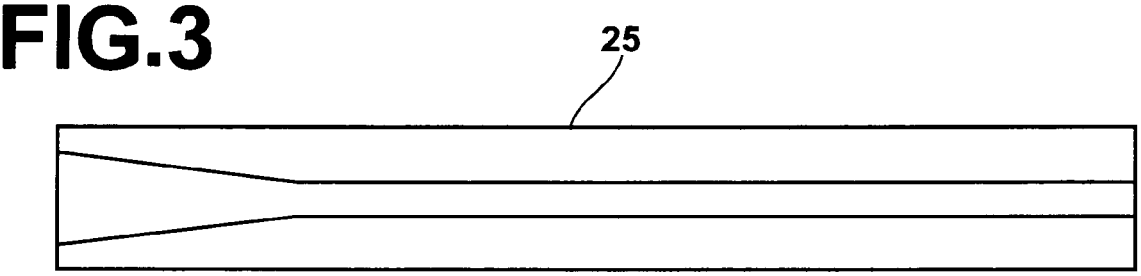
FIG. 3 is a brief cross-sectional view of a tapered fiber produced by heat treatment.

As shown in FIG. 2, a quartz fiber 21 is inserted into a silica glass tube 24 and the silica glass tube 24 and the quartz fiber 21 are set on an SiC heater 23 thermally insulated by an alumina heat insulation block 22. Then the quartz fiber 21 is heat-treated by the SiC heater 23. The inside of the silica glass tube 24 is filled with $N_2$ gas. The heat treatment is effected for about 30 to 50 hours at about 1,200 to 1,300° C. By this heat treatment, $GeO_2$ doped in the core of the quartz fiber 21 is diffused to expand the core diameter of the quartz fiber 21. After the heat treatment, the quartz fiber 21 is cut in a position of a desired core diameter and a desired clad diameter, whereby a tapered fiber 25 such as shown in FIG. 3 is obtained. Such a tapered fiber 25 is the same as the quartz fiber 21 before the heat treatment in its contour, and accordingly, is easier to handle as compared with the tapered fiber 15 produced by 1-1 A method of production by heating with a gas burner. Further, it is easily effected to cover the outside of the quartz fiber 21 with a protective sheet.

Figure 4A:
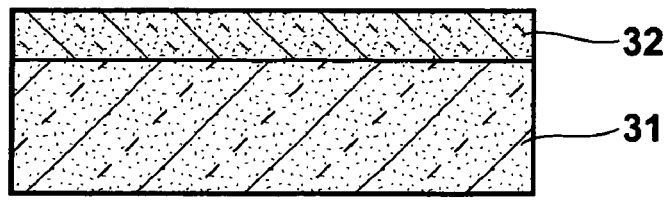
FIGS. 4A to 4E are views sectional for illustrating a method of producing an optical waveguide by a CVD method.
Figure 4B:
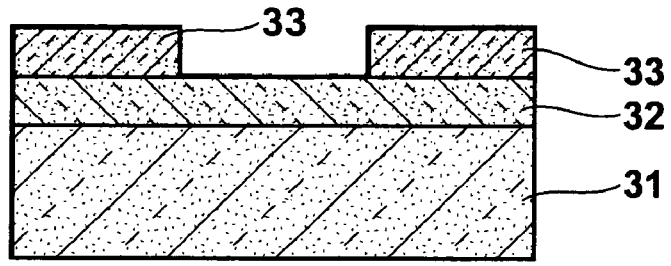
Figure 4C:
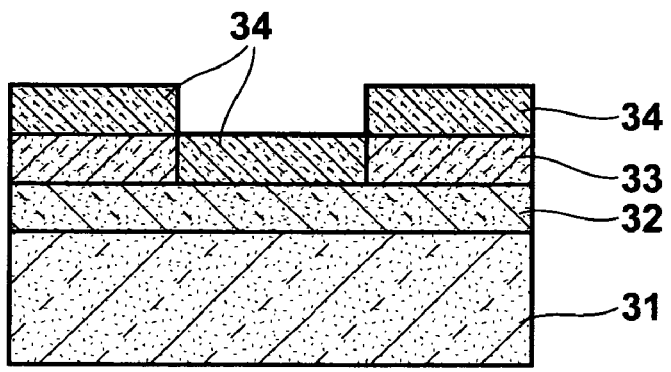
Figure 4D:
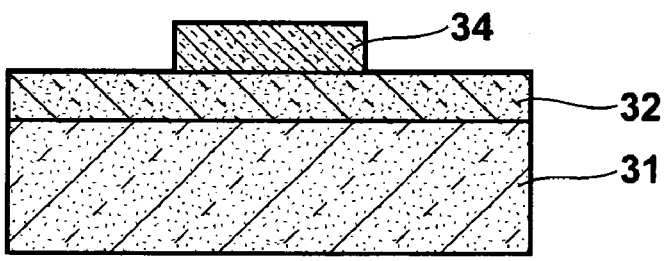
Figure 4E:
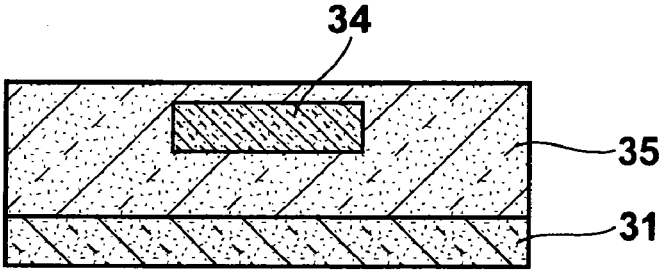
Figure 5:
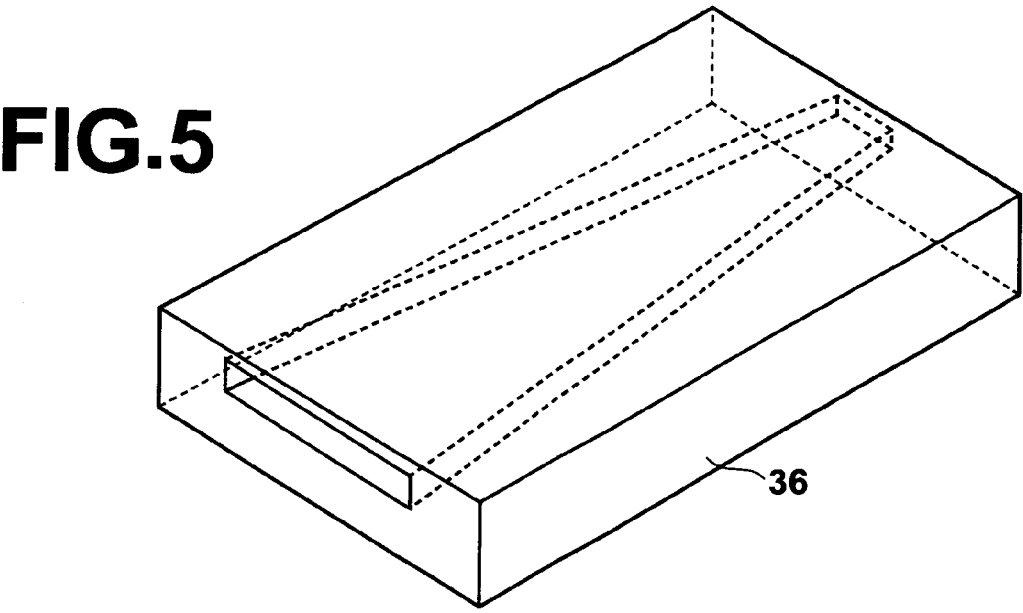
FIG. 5 is a perspective view of an optical waveguide produced by a CVD method.

1-3 A Method of Production by CVD $SiO_2$ film 32 is formed on a quartz or Si substrate 31 by heat treatment as shown in FIG. 4A. Otherwise, $SiO_2$ film 32 is formed on an Si substrate 31 by a CVD method. Then a tapered resist mask 33 is formed on the $SiO_2$ film 32 (FIG. 4B) and a $SiO_2GeO_2$ film 34 is stacked thereon by a CVD method (FIG. 4C). Then the resist mask 33 and the $SiO_2GeO_2$ film 34 stacked on the resist mask 33 are removed by lift off (FIG. 4D) and an $SiO_2$ film 35 is obtained by growing the $SiO_2$ film 32 to above the remaining $SiO_2GeO_2$ film 34 by a CVD method (FIG. 4E), whereby a tapered optical waveguide 36 is completed as shown in FIG. 5.

1-4 Characteristics of the Tapered Fiber

Figure 13A:
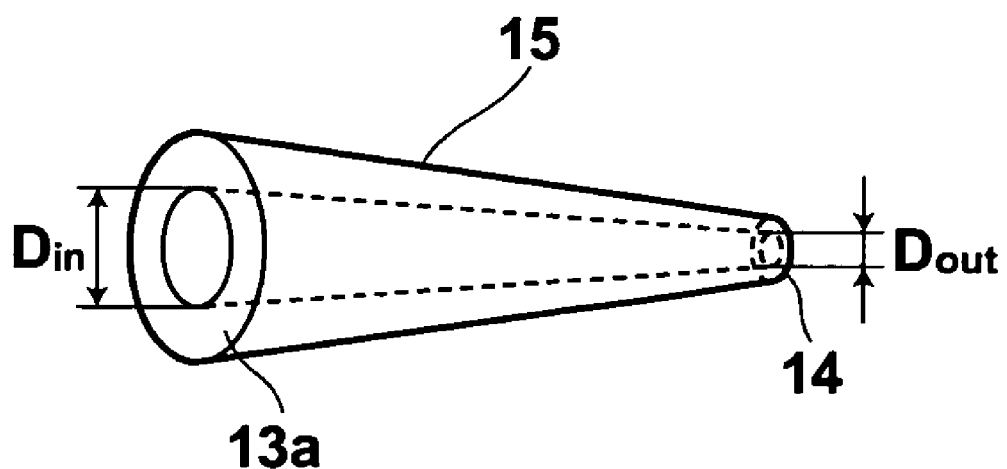
FIGS. 13A and 13B are views for illustrating the relation between a tapered fiber and various variables.
Figure 13B:
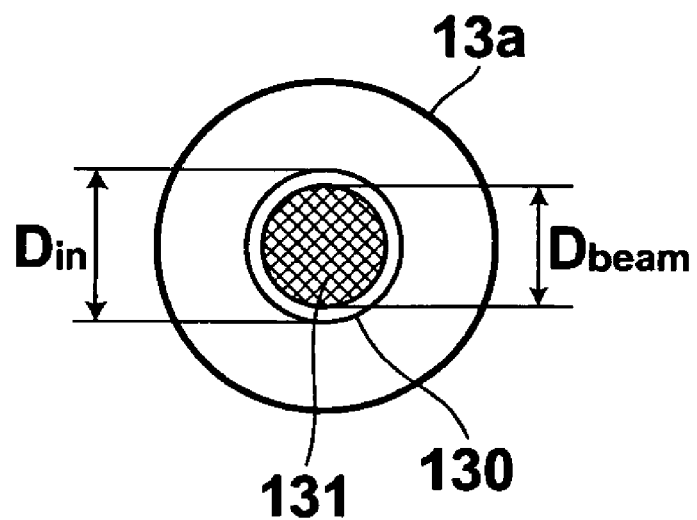

Methods of production of tapered fibers have been described in above 1-1 to 1-3. The beam coupling efficiency at the light inlet end face of the tapered fiber can be improved by defining the relation between the diameter at a light inlet end face of the tapered fiber of a light beam emitted from a light source to be described later, the numerical aperture of the light beam, and the core diameter and the numerical aperture of the light inlet end face and the light outlet end face of the tapered fiber as $$Din \times NAin = Dout \times NAout \quad (1)$$

and $$Dbeam < Din \text{ and } NAbeam < NAin \quad (2)$$

wherein the diameter or the length of the longer side of the core of the light inlet end face of the tapered fiber is represented by Din, the numerical aperture of the core at the light inlet end face of the tapered fiber is represented by NAin, the diameter or the length of the longer side of the core of the light outlet end face of the tapered fiber is represented by Dout, the numerical aperture of the core at the light outlet end face of the tapered fiber is represented by NAout, the diameter of light impinging upon the light inlet end face of the tapered fiber is represented by Dbeam, the numerical aperture of the light at the light inlet end face of the tapered fiber is represented by NAbeam. FIGS. 13A and 13B are views for illustrating the relation between a tapered fiber and various variables. FIG. 13A is on the tapered fiber 15 illustrated in FIGS. 1A to 1D and FIG. 13B shows the diameter Din of the core 130 of the light inlet end face 13a of the tapered fiber 15 and the diameter Dbeam of the light beam (the area indicated at 131) impinging upon the core 130. When the cores of the light inlet end face and the light outlet end face are rectangular as a tapered fiber 36 shown in FIG. 5, Din and Dout respectively represent the longer sides of the core of the light inlet end face and the core of the light outlet end face.

By defining the items to satisfy the above formulae (1) and (2), propagation loss of the laser beam in the tapered fiber is reduced and the tapered fiber can be high in efficiency. Further, the amount of light of the light beam to impinge upon the light inlet end face can be reduced, pollution of the light inlet end face of the tapered fiber is reduced and the service lives of the tapered fiber and the light source module comprising the tapered fiber can be elongated.

2. Light Source Module

Figure 6:
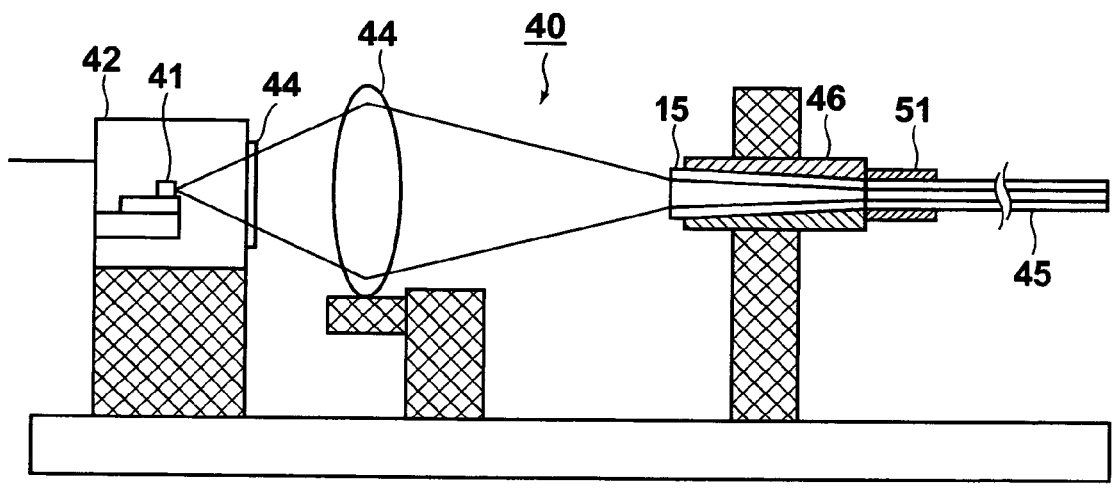
FIG. 6 is a brief view showing a light source module.

A light source module 40 in which a tapered fiber 15 produced in accordance with "1-1 A method of production by heating with a gas burner" is used will be described next with reference to FIG. 6. As shown in FIG. 6, the light source module 40 comprises a semiconductor laser 41, a light collective lens 44 (inlet optical system) which collects light beam which is emitted from the semiconductor laser 41 and passes through a window 44 and couples it to the light inlet end face of the tapered fiber 15, the tapered fiber 15 which causes the light beam coupled by the light collective lens 44 to enter there, and an optical fiber 45 (second optical waveguide) which is constant in the direction of waveguide in cross-sectional area of the core and is fused to or in contact with the light outlet end face of the tapered fiber 15. These elements are positioned in this order. It is preferred that the core diameter of the end face of the optical fiber 45 facing the tapered fiber 15 be not smaller than that of the light outlet end face of the tapered optical fiber 15 to prevent loss of light. The semiconductor laser 41 is hermetically sealed by a package 42, which is of a CAN type and is inexpensive, to protect the semiconductor laser 41 from pollution by the atmosphere.

Figure 7:
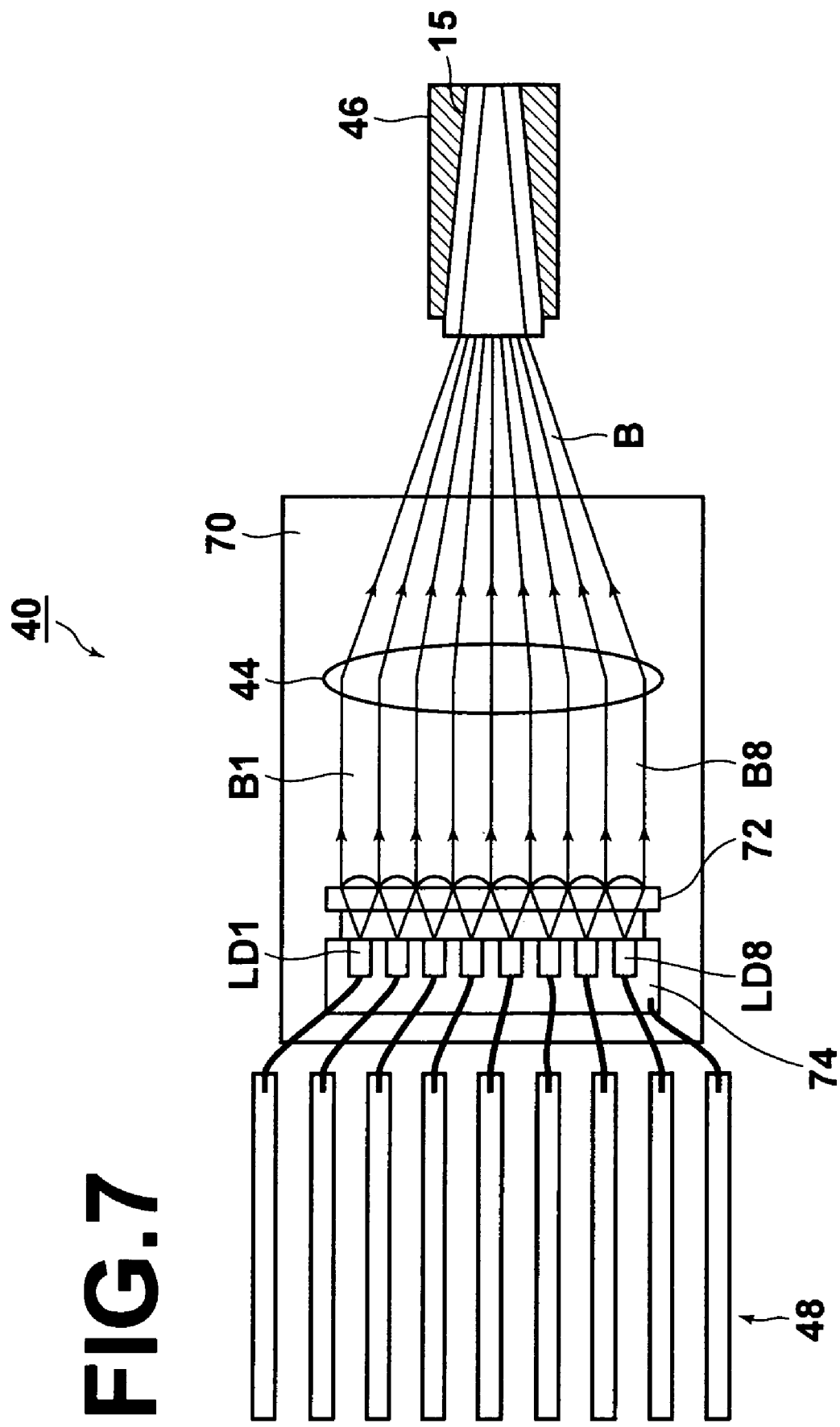
FIG. 7 is a plan view briefly showing the shape of the light source module.

FIG. 7 is a plan view briefly showing the shape of the light source module 40. The light source module 40 in this embodiment comprises eight (for instance) GaN semiconductor lasers LD-1 to LD-8 (corresponding to the semiconductor laser 40 in FIG. 6) positioned on and fixed to a heat block (heat radiator block) 74, a collimator lens array 72 and a light collective lens 44 and is arranged so that light collected by the light collective lens 44 is caused to enter the tapered fiber 15.

FIG. 7 shows a basic arrangement of the light source module 40 of this embodiment, and the shapes of the collimator lens array 72 and the light collective lens 44 are briefly shown. Further, for the purpose of simplification of the drawings, the semiconductor lasers LD1 and LD8 positioned on opposite ends out of the eight GaN semiconductor lasers LD-1 to LD-8 are only attached with reference numerals. The GaN semiconductor lasers LD-1 to LD-8 may be fixed to a sub-mount which may be, for instance, of AlN, and may be mounted on the heat block 74 as they are fixed to the sub-mount.

The laser beams B1 to B8 emitted from the GaN semiconductor lasers LD-1 to LD-8 as divergent light are collimated by the collimator lens array 72.

The collimated laser beams B1 to B8 are collected by the light collective lens 44. The tapered fiber 15 has been inserted into a ferrule 46 and is positioned as it is in the ferrule 46 so that the light inlet end face thereof conforms to the converging position of the laser beams. In this embodiment, the collimator lens array 72 and the light collective lens 44 form a light collective optical system and the light collective optical system and the tapered fiber 15 form a wave-composite optical system. That is, the laser beams B1 to B8 collected by the light collective lens 44 enter the core of the tapered fiber 15 and propagate in the tapered fiber 15. Further, the laser beams B1 to B8 propagate through the optical fiber 45 which is fused to or in contact with the light outlet end face of the tapered fiber 15 to emanate therefrom through the light outlet end face thereof. Drive currents are supplied to the GaN semiconductor lasers LD-1 to LD-8 by way of lines 48.

Figure 8:
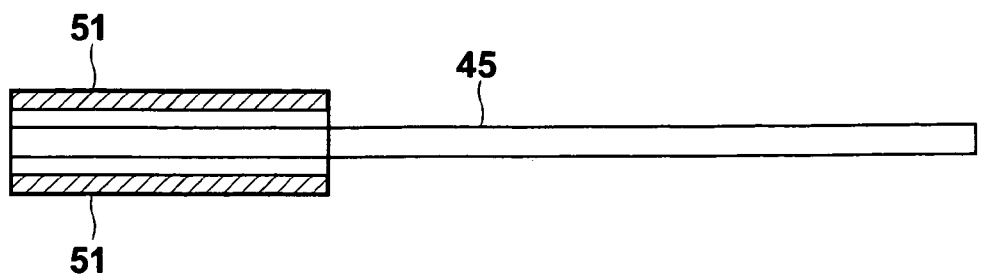
FIG. 8 is a view for illustrating an end portion of an optical fiber.

As shown in FIG. 8, the optical fiber 45 is about 125 μm in the outer diameter and about 50 μm in the core diameter, and inserted into a ferrule 51, which is larger than 125 μm in the inner diameter and is of, for instance, zirconia, and fixed there by an adhesive or the like. The ferrule 51 is precisely processed in its inner and outer diameters at a precision of not larger than 1 μm. The degree of eccentricity of the optical fiber 45 is precisely processed with respect to the outer diameter of the ferrule 51 at a precision of not larger than 1 μm. Such structure of optical fibers has been generally used and highly reliable.

Figure 9:
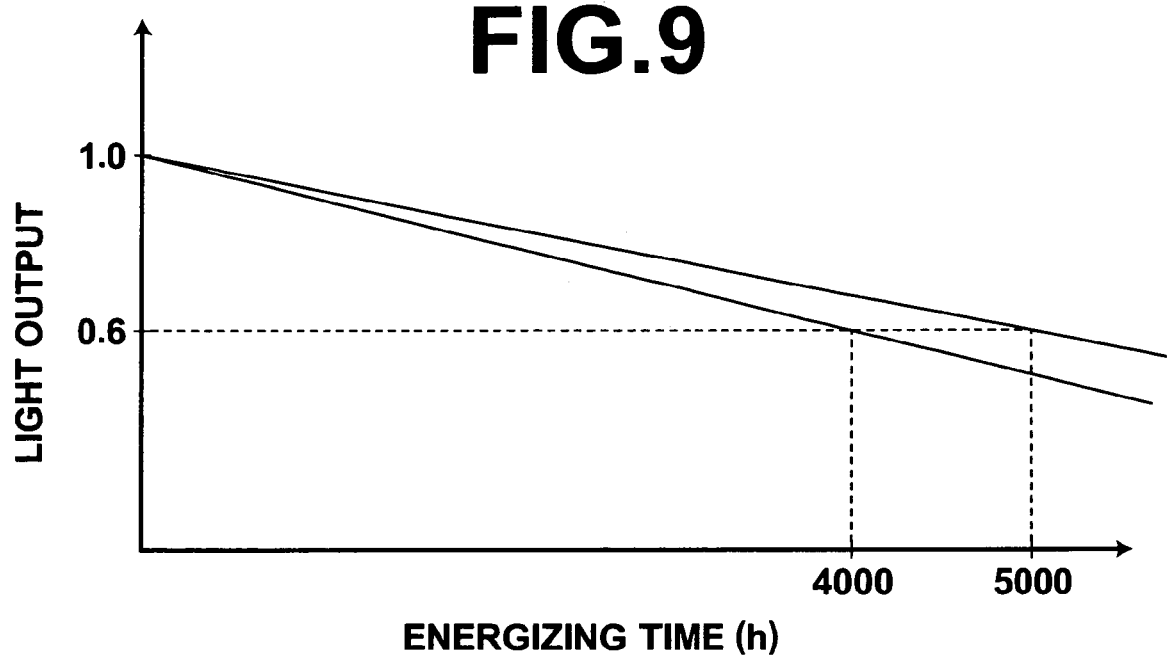
FIG. 9 is a graph showing a light output versus the energizing time of an optical fiber which is not hermetically sealed.

In the light source module 40, though the semiconductor laser 41 is hermetically sealed by a CAN type package 42, the tapered fiber 15 and the optical fiber 45 are not hermetically sealed. Characteristics of an optical fiber when its outlet end is not hermetically sealed will be described with reference to FIGS. 9 and 10, hereinbelow. A light beam of a GaN semiconductor laser, whose service life is estimated to be not shorter than ten thousand hours at a wavelength of 390 to 410 nm and an LD power of 50 to 100 mW under a general laboratory/interior environment, was shaped so that the light beam was of an ellipsoid of 20×40 (μm) and was caused to impinge upon the light inlet end face of an optical fiber, whose core diameter was 50 to 100 μm and whose outer diameter was 125 μm. The relation between the energizing time (light entering time) and the light output at the time is shown in FIG. 9. When a laser beam long impinged upon the light inlet end face of the optical fiber with the drive current to the semiconductor laser kept constant, the transmittance became 50 to 60% of that immediately after the laser beam started to impinge upon the light inlet end face of the optical fiber in 4000 to 5000 hours.

Figure 10:
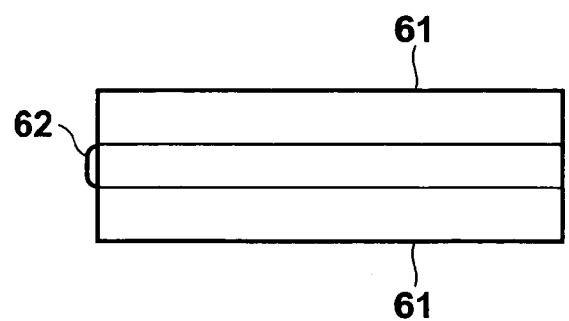
FIG. 10 is a cross-sectional view for illustrating an inlet end portion of an optical fiber which is not hermetically sealed.

When the light inlet end face of the optical fiber at this time was observed, deposit adhered to the surface of the core of the light inlet end face as shown in FIG. 10. In FIG. 10, reference numeral 61 denotes an optical fiber and reference numeral 62 denotes deposit adhering to the light inlet end face of the optical fiber 61. When the deposit 62 was observed through a metallurgical microscope, color was changed and ellipsoidal streaks were observed from the center to the periphery. Further, when the deposit 62 was observed through an AFM (atomic force microscope) or an SEM (scanning electron microscope), a part near the center of the light beam seems to be elevated. In the deposit 62, the thickness corresponding to where the light power density is maximized is maximum. This shows that the thickness of the deposit 62 depends upon the light power density. Specifically, the thickness of the deposit 62 was hundreds to thousands of nm as viewed through an AFM, and x-ray photoelectron spectroscopic analysis said that the deposit 62 was an organic compound of Si series.

Further, the characteristics of the light source module of this embodiment and the characteristics of the conventional light source module were measured. The following table 1 shows the light power density versus various conditions for the light source module of this embodiment and the conventional light source module. In this measurement, the used semiconductor laser was not shorter than 20,000 hours in the estimated service life, and a GaN laser 390 to 410 nm in its oscillation wavelength and 200 mW in its rated output were driven in AC drive, at 200 mW at the beginning. The power density at the light inlet end face of the light source module 40 of this embodiment was reduced to about one tenth of the conventional light source module and accordingly, in the light source module 40 of this embodiment, adherence of pollutant was reduced and elongation of the service life of the light source module 40 was realized. As a result, the service life of the light source module 40 of this embodiment was elongated by three times as compared with that of the conventional light source module.

TABLE 1

| | input fiber ($\phi\mu m$) | output fiber ($\phi\mu m$) | LD power (PmW) | input beam ($\phi\mu m$) | power density (mW/$\mu m^2$) |
|---|---|---|---|---|---|
| conventional | 50 | 50 | 200 | 40 | 0.159 |
| embodiment | 200 | 50 | 200 | 155 | 0.11 |

Further, the service life of the light source module 40 when the input beam diameter was changed with the LD power held 200 mW was measured. Table 2 shows the light power density for the various input beam diameters.

TABLE 2

| LD power (PmW) | input beam diameter ($\phi\mu m$) | power density (mW/$\mu m^2$) |
|---|---|---|
| 200 | 18 | 0.786 |
| 200 | 90 | 0.32 |
| 200 | 57 | 0.078 |
| 200 | 155 | 0.011 |

Figure 11:
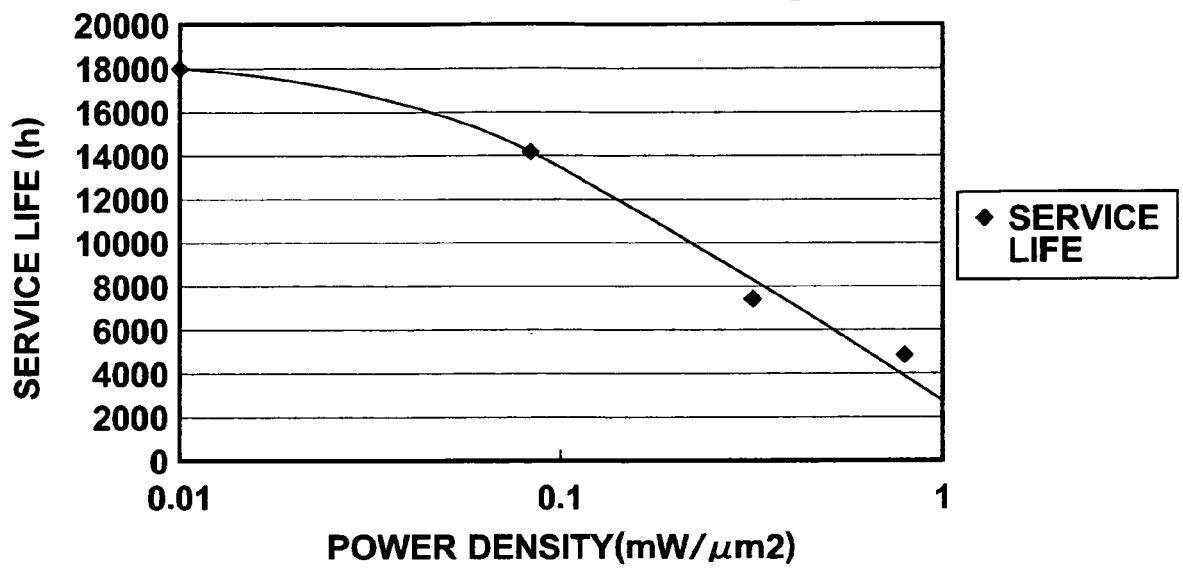
FIG. 11 is a graph showing a service life versus the power density of a light source module.
Figure 12:
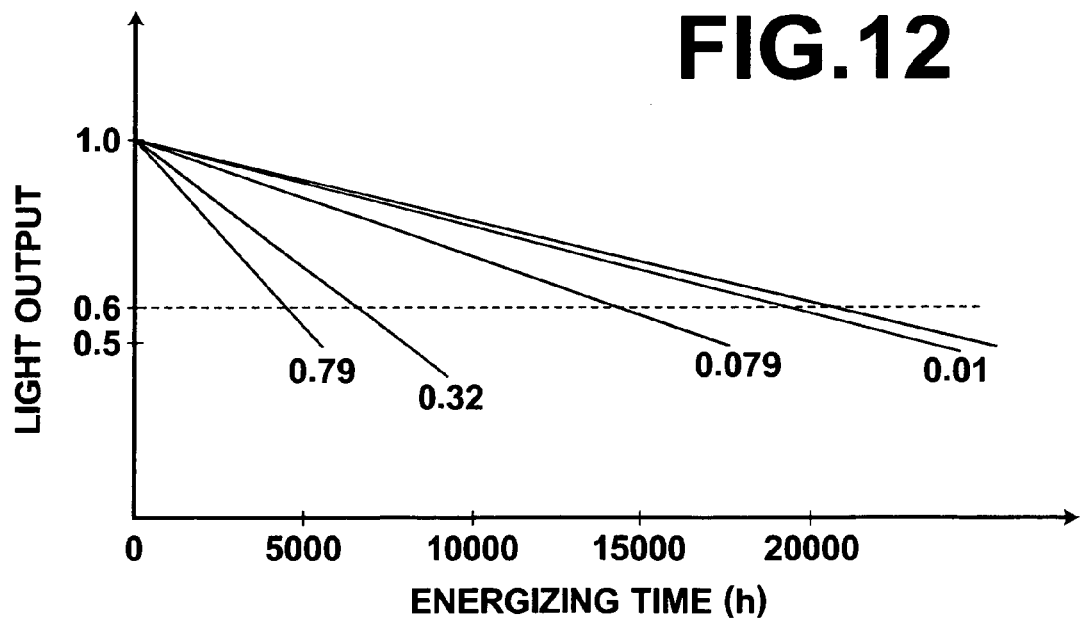
FIG. 12 is a graph showing a light output versus the energizing time at various power densities.

FIG. 11 shows the service life of the light source module 40 versus the light power densities shown in table 2. FIG. 12 is a graph showing a light output versus the energizing time (light entering time) at various power densities with measuring data when the light inlet end face of the optical fiber is hermetically sealed added. Here "the service life of the light source module 40" means a time which is taken before the light power density at the light inlet end face of the tapered fiber 15 is reduced to about 60% when a laser beam is continuously emitted with the drive current to the semiconductor laser 41 held constant. As shown in FIG. 11, the service life of the light source module 40 was more than 14000 hours when the light power density was not higher than 0.08 mW/$\mu m^2$. This shows that the service life of the light source module 40 can be elongated by causing a laser beam to enter a tapered fiber 15 at a light power density not higher than 0.08 mW/$\mu m^2$.

Further, since a laser beam emitted from the semiconductor laser 41 was large in diameter and low in light power density, deterioration due to adhesion of pollutant to different optical systems in the light source module 40 such as the inlet optical system 44 was not observed.

As can be understood from the description above, by using a tapered fiber 15 where the core diameter at the light inlet end face is larger than that at the light outlet end face as an optical waveguide for the light source module 40, the light power density can be lowered, and adhesion of pollutant can be suppressed. Further, since the light outlet end face of the tapered fiber 15 is small in the core diameter, an output beam can be high in power density and a bright laser beam which is large in light power per unit area can be obtained. Further, since only the semiconductor laser 41 is hermetically sealed in a package, a light source module which is inexpensive and highly reliable can be realized.

Further, by fusing or positioning a general purpose optical fiber 45 to or in contact with the light outlet end face of the tapered fiber 15, the tapered fiber 15 which is unique in shape of the core may be positioned only in the light inlet portion and a light source module which is high in degree of freedom can be designed.

The core diameter, clad diameter and the like of the tapered fiber 15 and the optical fiber 45 need not be limited to those used in this embodiment but may be variously changed within the spirit of this invention.

What is claimed is:

1. A light source module comprising
   at least one light source,
   a first optical waveguide which causes light entering therein from a light inlet end face to emanate from a light outlet end face, and
   an inlet optical system which collects light emitted from the light source and couples it to the light inlet end face of the first optical waveguide, wherein the improvement comprises that the light inlet end face of the first optical waveguide is larger than the light outlet end face thereof in cross-sectional area of the core;
   wherein, when the diameter of light impinging upon the light inlet end face of the first optical waveguide is represented by Dbeam, the numerical aperture of the light at the light inlet end face of the first optical waveguide is represented by NAbeam, the diameter or the length of the longer side of the core of the light inlet end face of the first optical waveguide is represented by Din, the numerical aperture of the core at the light inlet end face of the first optical waveguide is represented by NAin, the diameter or the length of the longer side of the core of the light outlet end face of the first optical waveguide is represented by Dout and the numerical aperture of the core at the light outlet end face of the first optical waveguide is represented by NAout, Din×NAin=Dout×NAout, Dbeam<Din and
   NAbeam<NAin.

2. A light source module as defined in claim 1 in which the first optical waveguide comprises an optical fiber.

3. A light source module as defined in claim 2 in which a second optical waveguide which is constant in the direction of waveguide in cross-sectional area of the core is fused to or in contact with the light outlet end face of the first optical waveguide.

4. A light source module as defined in claim 3 in which the second optical waveguide comprises an optical fiber.

5. A light source module as defined in claim 2 in which the light source comprises one of a single single-mode cavity semiconductor laser, single-mode cavity semiconductor lasers arranged in an array, a single multiple cavity semiconductor laser, multiple cavity semiconductor lasers arranged in an array, and combinations of a single cavity semiconductor laser and a multiple cavity semiconductor laser.

6. A light source module as defined in claim 1 in which a second optical waveguide which is constant in the direction of waveguide in cross-sectional area of the core is fused to or in contact with the light outlet end face of the first optical waveguide.

7. A light source module as defined in claim 6 in which the second optical waveguide comprises an optical fiber.

8. A light source module as defined in claim 1 in which the light source comprises one of a single single-mode cavity semiconductor laser, single-mode cavity semiconductor lasers arranged in an array, a single multiple cavity semiconductor laser, multiple cavity semiconductor lasers arranged in an array, and combinations of a single cavity semiconductor laser and a multiple cavity semiconductor laser.

* * * * *